(12) United States Patent
Yahalom et al.

(10) Patent No.: US 7,702,667 B2
(45) Date of Patent: Apr. 20, 2010

(54) METHODS AND SYSTEMS FOR VALIDATING ACCESSIBILITY AND CURRENCY OF REPLICATED DATA

(75) Inventors: Raphael Yahalom, Needham, MA (US); Roee Alon, Boston, MA (US); Assaf Levy, Boston, MA (US); Omri Kessel, Boston, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 11/529,748

(22) Filed: Sep. 27, 2006

(65) Prior Publication Data

US 2007/0088763 A1 Apr. 19, 2007

Related U.S. Application Data

(60) Provisional application No. 60/720,977, filed on Sep. 27, 2005.

(51) Int. Cl.
*G06F 12/00* (2006.01)
*G06F 11/00* (2006.01)
(52) U.S. Cl. .................. 707/611; 707/689
(58) Field of Classification Search .......... None
See application file for complete search history.

(56) References Cited

U.S. PATENT DOCUMENTS

| | | | |
|---|---|---|---|
| 5,043,866 A * | 8/1991 | Myre et al. ............... 707/202 |
| 5,280,611 A * | 1/1994 | Mohan et al. ............... 707/8 |
| 5,327,556 A * | 7/1994 | Mohan et al. ............... 707/8 |
| 5,381,545 A * | 1/1995 | Baker et al. ............... 714/19 |
| 5,452,448 A | 9/1995 | Sakuraba et al. |
| 5,774,377 A | 6/1998 | Eidson et al. |
| 5,825,772 A | 10/1998 | Dobbins et al. |
| 5,940,819 A | 8/1999 | Beavin et al. |
| 6,014,673 A * | 1/2000 | Davis et al. ............... 707/202 |
| 6,223,176 B1 | 4/2001 | Ricard et al. |
| 6,233,240 B1 | 5/2001 | Barbas et al. |
| 6,240,463 B1 | 5/2001 | Benmohamed et al. |
| 6,327,598 B1 | 12/2001 | Kelley et al. |
| 6,347,335 B1 | 2/2002 | Shagam et al. |

(Continued)

FOREIGN PATENT DOCUMENTS

WO    WO-01/82077    11/2001

(Continued)

OTHER PUBLICATIONS

"Storage Management and the Continued Importance of CIM," White Paper, Data Mobility Group (Jan. 2004).

(Continued)

*Primary Examiner*—John R Cottingham
*Assistant Examiner*—Nirav K Khakhar
(74) *Attorney, Agent, or Firm*—Ropes & Gray LLP (57) ABSTRACT

Systems and processes for determining and validating accessibility and currency, i.e., the actual status, of data replicated in a networked environment are disclosed. According to the disclosed process, a replicated-data policy for replicating data is defined, and access paths between network devices or between applications running on the network devices are monitored, for example, by a replicated-data monitor. Also monitored are the data replication activities in the network. The currency, i.e., timeliness, and accessibility of a replica by a network device is then compared with the requirements in the replicated-data policy and discrepancies with the replicated-data policy are identified, optionally accompanied by a notification.

22 Claims, 6 Drawing Sheets

U.S. PATENT DOCUMENTS

| | | | |
|---|---|---|---|
| 6,434,626 B1 | 8/2002 | Prakash et al. |
| 6,636,981 B1 | 10/2003 | Barnett et al. |
| 6,691,169 B1 | 2/2004 | D'Souza |
| 6,751,228 B1 | 6/2004 | Okamura |
| 6,792,503 B2 | 9/2004 | Yagi et al. |
| 6,795,399 B1 | 9/2004 | Benmohamed et al. |
| 6,816,927 B2 | 11/2004 | Bouchet |
| 6,904,143 B1 | 6/2005 | Peterson et al. |
| 6,909,700 B1 | 6/2005 | Benmohamed et al. |
| 7,051,029 B1 | 5/2006 | Fayyad et al. |
| 7,058,702 B2 | 6/2006 | Hogan |
| 7,062,559 B2 | 6/2006 | Yoshimura et al. |
| 7,069,480 B1 | 6/2006 | Lovy et al. |
| 7,103,653 B2 | 9/2006 | Iwatani |
| 7,103,712 B2 | 9/2006 | Mizuno |
| 7,120,654 B2 | 10/2006 | Bromley |
| 7,127,633 B1 | 10/2006 | Olson et al. |
| 7,149,886 B2 | 12/2006 | Fujibayashi et al. |
| 7,194,538 B1 | 3/2007 | Rabe et al. |
| 7,260,628 B2 | 8/2007 | Yamamoto et al. |
| 7,376,937 B1 | 5/2008 | Srivastava et al. |
| 7,380,239 B1 | 5/2008 | Srivastava et al. |
| 7,512,954 B2 | 3/2009 | Srivastava et al. |
| 2002/0145981 A1 | 10/2002 | Klinker et al. |
| 2003/0005119 A1 | 1/2003 | Mercier et al. |
| 2003/0018619 A1 | 1/2003 | Bae et al. |
| 2003/0055932 A1 | 3/2003 | Brisse |
| 2003/0101258 A1 | 5/2003 | Parham |
| 2003/0131077 A1 | 7/2003 | Hogan |
| 2003/0191992 A1 | 10/2003 | Kaminsky et al. |
| 2003/0208589 A1 | 11/2003 | Yamamoto |
| 2003/0237017 A1 | 12/2003 | Jibbe |
| 2004/0019833 A1 | 1/2004 | Riedl |
| 2004/0030739 A1 | 2/2004 | Yousefi'zadeh |
| 2004/0030768 A1 | 2/2004 | Krishnamoorthy et al. |
| 2004/0075680 A1 | 4/2004 | Grace et al. |
| 2004/0205089 A1 | 10/2004 | Alon et al. |
| 2004/0215749 A1 | 10/2004 | Tsao |
| 2005/0010682 A1 | 1/2005 | Amir et al. |
| 2005/0044088 A1* | 2/2005 | Lindsay et al. ............. 707/100 |
| 2005/0097471 A1 | 5/2005 | Faraday et al. |
| 2005/0114403 A1* | 5/2005 | Atchison ................. 707/200 |
| 2005/0160431 A1 | 7/2005 | Srivastava et al. |
| 2006/0004830 A1 | 1/2006 | Lora et al. |
| 2006/0143492 A1 | 6/2006 | LeDuc et al. |
| 2006/0161883 A1 | 7/2006 | Lubrecht et al. |
| 2006/0161884 A1 | 7/2006 | Lubrecht et al. |
| 2006/0218366 A1 | 9/2006 | Fukuda et al. |
| 2007/0094378 A1 | 4/2007 | Baldwin et al. |
| 2007/0112883 A1* | 5/2007 | Asano et al. ............... 707/202 |
| 2007/0198722 A1 | 8/2007 | Kottomtharayil et al. |

FOREIGN PATENT DOCUMENTS

| | | |
|---|---|---|
| WO | WO-02/088947 | 11/2002 |
| WO | WO-03/054711 | 7/2003 |
| WO | WO-2004/111765 | 12/2004 |

OTHER PUBLICATIONS

"Softek SANView: Simplify the discovery and management of multi-vendor SANs," Fujitsu Softek (May 2002).

"Information Lifecycle Management: An Automated Approach," Technical White Paper, EMC2 (Dec. 8, 2003).

International Search Report and Written Opinion dated Mar. 26, 2009 as Application No. PCT/US2008/013930.

"Kasten Chase Unveils Advanced Security Architecture," GRIDtoday, v.1, n.18; www.gridtoday.com/02/101/100546.html, (Oct. 14, 2002), printed from Internet on Oct. 16, 2003.

"Assurency: Comprehensive, Persistent Security for Storage Area Networks," Kasten Chase (2002).

"Radiant Data Server Technology Overview," White Paper, Radiant Data Corporation (2003).

Lee et al., "Storage Network Management Software—The Critical Enabler of Maximum ROI," Storage Consulting Group (Dec. 16, 2002).

European Extended Search Report and Written Opinion issued Nov. 12, 2009 for co-pending EP06804208.

* cited by examiner

REPLICATION VIOLATION
ROOT CAUSE ANALYSIS

FILE  EDIT  VIEW  ACTION  HELP

VIOLATIONS 149
DAILY CHANGES 0
SWITCH PORTS 1488

VALIDATION
- VIOLATIONS
- AUTHORIZED PATHS
- PATHS
- CHANGES
- VULNERABILI...
- PLANS

DISASTER RECOVER
- DR VIOLATIONS
- DR PATHS
- DR RULES

INVENTORY
- SWITCHES
- HOSTS & CLUSTERS
- STORAGE DEVICES
- TAPES
- GENERIC DEVICES
- ZONES

VIOLATION LIST (6382) — 601

VIOLATION TYPE THEN ACCESS PATH

| VIOLATION TYPE | TYPE | HOST | LOCAL STORAGE | VOLUME | REPLICA | REMOTE STORAGE | REPLICA | SECONDARY | HOST | SINCE |
|---|---|---|---|---|---|---|---|---|---|---|
| DR  DR PATH OUTAGE | 1,2 | ORAPROD1 | SYM-01300 |  |  |  |  |  |  | 8/5/05 5:29PM |
| DR PATH OUTAGE | 1 | ORAPROD1 | SYM-01300 | 0180 |  |  |  |  |  | 8/5/05 5:29PM |
| DR PATH OUTAGE | 1 | ORAPROD1 | SYM-01300 | 0180 |  |  |  |  |  | 8/8/05 12:53P |
| DR PATH OUTAGE | 2 | ORAPROD1 | SYM-01300 | 01FE |  |  |  |  |  | 8/8/05 12:53P |
| DR PATH OUTAGE | 2 | ORAPROD1 | SYM-01300 | 01FE |  |  |  |  |  |  |
| EXT  EXTENDED PATH | 3 | ORAPROD1 | SYM-01300 | 01FC |  | SYM-00816 | 02B9 |  | ORADR | 8/5/05 5:23PM |
| EXTENDED PATH | 3 | ORAPROD1 | SYM-01300 | 01FC |  | SYM-00816 | 02B9 |  | ORADR | 8/5/05 5:23PM |
| EXTENDED PATH 3... | 3 | ORAPROD1 | SYM-01300 | 01FC |  | SYM-00816 | 02B9 |  | ORADR | 8/5/05 5:23PM |

CHANGE LIST (1157) — 602

ALL  ALL

| TIME | EVENT |
|---|---|
| 4/24/05 2:50PM | + FABRIC/VSAN ATT FAB31W1 ON PRINCIPAL ATT FAB31W1 (ATTFAB31W1) CONFIGURATION CHANGED (BY UNKNOWN) |
|  | ° STORAGE SYM-1300 PORT RF-11B PORT: 0 IS REMOVED FROM ZONE SYMM1300RF11B SYMM0816RF11B |
| 4/24/05 2:50PM | + FABRIC/VSAN ATT FAB31W1 ON PRINCIPAL ATT FAB31W1 (ATTFAB31W1) CONFIGURATION CHANGED (BY UNKNOWN) |
| 4/24/05 2:50PM | + FABRIC/VSAN ATT FAB31W1 ON PRINCIPAL ATT FAB31W1 (ATTFAB31W1) CONFIGURATION CHANGED (BY UNKNOWN) |
| 4/24/05 2:50PM | + FABRIC/VSAN ATT FAB31W1 ON PRINCIPAL ATT FAB31W1 (ATTFAB31W1) CONFIGURATION CHANGED (BY UNKNOWN) |

TOPOLOGY  PROPERTIES  PORTS  ZONES  MASKING  VOLUMES  PATHS  VIOLATIONS  CHANGES  REPLICATIONS  DR PA...

Figure 6

METHODS AND SYSTEMS FOR VALIDATING ACCESSIBILITY AND CURRENCY OF REPLICATED DATA

CROSS-REFERENCE TO OTHER PATENT APPLICATIONS

This application claims the benefit of U.S. Provisional Patent Application No. 60/720,977, filed Sep. 27, 2005, the entire content of which is incorporated herein by reference.

BACKGROUND OF THE INVENTION

The invention is directed to methods and systems for determining and validating accessibility and currency, i.e., the actual status, of data replicated in a networked environment.

Data replication is a technique commonly used for achieving high data availability. When multiple replicas of a data set are created and stored at different locations, a replica of the data will more likely be available to a client application even when some components fail or some data sets are corrupted.

In computing systems many techniques exist for copying data and for managing multiple replicas. Replication techniques can be classified to two main categories: synchronous and asynchronous replication. Synchronous replication processes enforce continuous full synchronization between the source data set and the replicas. This involves strong transactional guarantees and ensures that any update to a source data set is consistently and immediately reflected in all the synchronous replicas. However, achieving synchronous replication can in some environments be prohibitively expensive in terms of the overhead it imposes on computing resources, and in some cases not be possible at all (for example due to temporary failure of some component in the environment).

Asynchronous replication, on the other hand, requires a much less stringent time-consistency between replicas by creating copies only periodically. Thus a replica may represent some past state of the data source rather than the current state of the data source. Depending on how far back in the past that reference point is, such discrepancy may still be acceptable for some client applications under some exceptional circumstances (e.g., when recovering from a catastrophic failure). Asynchronous replication imposes a much lower overhead on the computing resources and is commonly used in many environments, such as maintaining geographically remote copies of application data for Disaster-Recovery (DR) purposes.

However, ensuring continuous conformance of the data sets and their replicas with the applications requirements is a difficult challenge for a number of reasons: different applications may have different minimal currency requirements for replicated-data (that is, there are typically differences in their cost/currency trade-off considerations); there may be multiple data-copiers in a typical environment that may be executing concurrently; copy activities may be based on replicas (which may themselves not be fully current) rather than on the original data set, thus creating chains of dependencies; individual copy activities may fail entirely, and a replica at a remote site may be inaccessible to a host due for example to a network or component configuration problem.

Consequently an application may not have a replica of sufficient currency accessible to it at a remote site, if required. Currently, such a deficiency may not be detected until an application actually requires that replica. Present replication technologies focus on the actual correctness of individual copy mechanism, but not on continuous end-to-end validation of the currency and accessibility of multiple replicas of data.

It would therefore be desirable to provide systems and processes for continuously validating replicated data sets in networks as being in conformance with defined application requirements for currency and accessibility, and for identifying and notifying a user of any discrepancies so that corrective actions can be taken before any undesirable consequences.

SUMMARY OF THE INVENTION

The invention is directed to systems and processes for continuously validating replicated data sets in networks as being in conformance with a replicated-data policy.

According to one aspect of the invention, a process for validating replicated data residing on network devices in a network includes the steps of defining a replicated-data policy for replicating data in the network, monitoring access paths between network devices or between applications running on the network devices, monitoring data replication activities in the network, and comparing currency and accessibility of a replica with the requirements in the replicated-data policy to identify discrepancies with the replicated-data policy.

According to another aspect of the invention, a replication validation manager for validating replicated data residing on network devices in a network includes a policy engine that stores replicated-data policy for replicating data in the network and a validation engine that monitors access paths between network devices or between applications running on the network devices. The validation engine further monitors data replication activities in the network and compares currency and accessibility of a replica with the requirements in the replicated-data policy to identify discrepancies with the replicated-data policy. The replication validation manager also includes a notification engine that provides a violation notification if a replica cannot be validated.

Embodiments of the invention may include one or more of the following features. The replicated-data policy may specify an access path between a host or application and a replica, and/or a number of replicas in a network, locations of the replicas, one or more access paths between the replicas, and/or a maximum age of a corresponding replica at each location. The data replication activities may include monitoring at least one of synch, split, copy start, copy complete, source data volume, target data volume, and a time of the replication.

Each replica may be associated with a tag which may include at least one of a source data set name, the copy status, and a time stamp. The tag of a replica may be updated in response to a copier event.

Access path attributes may include redundancy and/or number of intermediate components and/or performance and/or security and/or interoperability, sharability, or capacity.

Discrepancies may be identified from a currency violation and/or missing access path and/or unauthorized access path, and/or path attribute violation.

In another embodiment, replication reports may be generated which may include properties of applications, replicas and replication events, and their impact on replicas; replication violations and time to correct them; replication resource utilization over time, or a combination thereof.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION

In the context of the invention, the following terminology will be used for classifying components of replicated data environments:

Definitions

Host Components are platforms on which application software programs can execute to achieve some useful purpose. At any point in time each host can have one or more applications executing on it. Each application can be executing on one or more host components. In addition each host may contain control programs which control the access to host resources and to external components.

Storage Components are platforms on which data can be stored and retrieved. Each storage device contains a memory sub-component containing multiple addresses in each of which one or more bits can be stored. Data is read from and written to storage devices in units which are referred to as volumes. A volume may contain any amount of data represented by any number of bits. Volumes are stored on storage devices, each starting with a particular start address on a particular storage component. In addition, each storage component may also contain a controller sub-component which controls access to the data in the memory sub-component.

Network components are platforms via which data can be transferred and routed from any source component to any target component. Each network component can control the flow of data depending on the source, destination and status circumstances.

Each of the aforementioned components have a unique identifier (name) associated with it. Moreover, each of the components has one or more ports which enable input and output data to flow to and from that component. Each component can furthermore have a local state which represents a current "Control Configuration" of that component defining certain information flow characteristics such as which data flow can be enabled based on the source and the target components.

Different components can be connected to each other by "Communication Links" via which data can flow from one component to another. Such communication links can connect components located in very close proximity at single site, or at remote geographical locations. Example communication channels can include a cable a point-to-point connection, a local area network, a wide area network and others.

An Access Path exists between two end points (components, data sets, etc) if there is communication links connectivity, and if each intermediate component as well as the end point themselves are configured to enable data flow between these end points.

Environment Configuration Events that can occur in an environment can be classified to different classes including among others: components configuration changes, components addition and deletion, components failed and recovered, data send and receive, data volumes reads and writes, and others.

Applications running on hosts can generate new "Data Volumes" and submit them for storage on storage devices, as well as update or read existing data volumes stored on storage devices.

A Data Copier is a program which at certain points in time reads a volume from a storage device and writes an identical copy of that volume to another location (address) on the same storage device or a different storage device. A copier can execute on any component (host component, storage component, or network component). An initial source volume updated by an application is referred to a source volume, and any volume which was generated by a copier is referred to as a replica volume.

Figure 1:
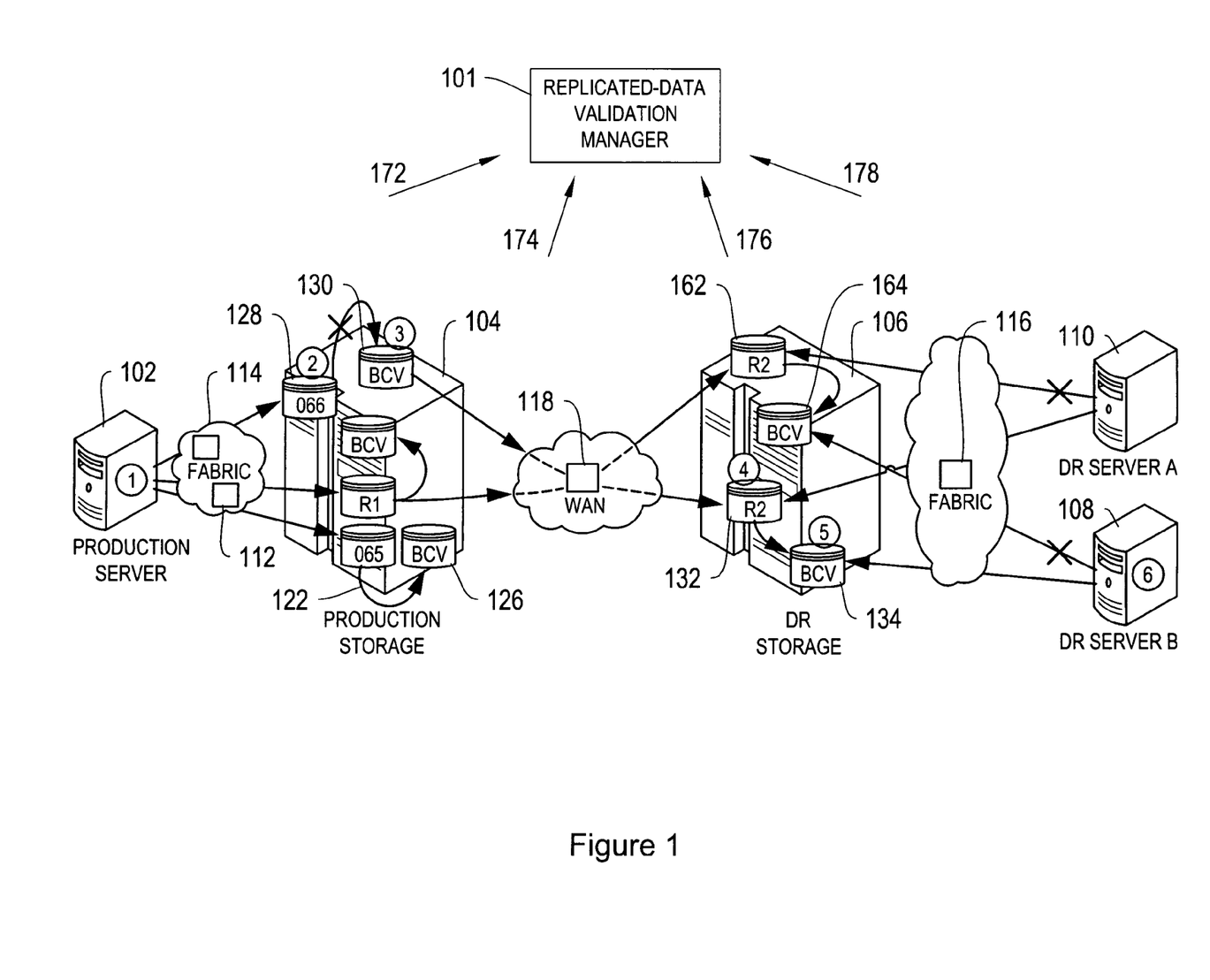
FIG. 1 shows a schematic diagram of an exemplary replicated-data environment and a replicated-data validation manager according to the invention.

FIG. 1 depicts an exemplary environment of a replicated-data environment with three host-components 102, 108 110, a number of network components, such as switches or routers, 112, 114, 116 in a storage area network and a network component 118 in wide area network, two storage components 104 and 106, as well as several data volumes and replicas, of which, for example, 128 is a source volume, 130 is a local replica of source volume 128, 132 is a remote replica of source volume 128, and 134 is local replica of remote replica 132 and hence a remote copy of source volume 128. The copy activities for each of the replica are performed independently at different points in time. The sequential configuration of devices 102, 114, 128, 130, 118, 132, 134, 108 is an example of a Disaster-Recovery (DR) access path—provided all the local components are properly configured to enable data transfer along that DR access path.

A Replicated-Data Validation Manager 101 is connected to the networks, as indicated by arrows 172, 174, 176, 178, and performs the process described below in order to validate the currency and accessibility of all data replicas in accordance with a specified application data-replication policy.

Figure 2:
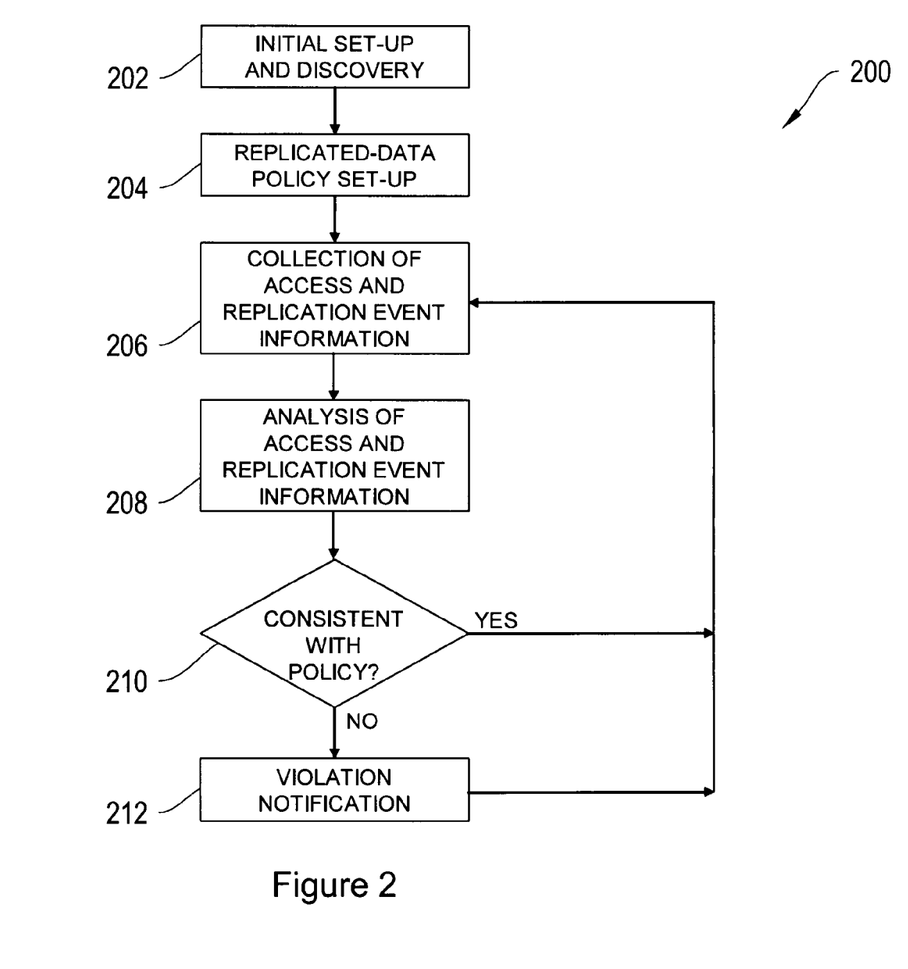
FIG. 2 is a schematic high level flow diagram for replicated-data validation.

FIG. 2 shows a high-level process flow 200 of a replicated-data validation process. Process 200 starts at step 202 (initial set-up) where the target environment (components, links, data copiers etc) is initially discovered.

At step 204, a replicated-data application policy is defined. For each data volume the policy defines: application access path (and attributes) to that volume, access path between replicas of that volume, and attributes, access paths from replicas to other hosts, required minimal currency (or maximally tolerable age) requirements of replicas at different locations (also referred to as Recovery Point Objectives (RPO))

At step 206, information is obtained about events in the environment that affect the currency of replicas or their accessibility. For example, information may be received indicating that a copy action was successfully completed from replica 130 to replica 132 (FIG. 1) at time T which is relevant for determining the currency status of replica 132. Information may be received about a disruption in the link between host component 108 and replica 134 which is relevant for determining the accessibility of replica 134.

At step 208, an analysis is performed to derive from the event information about the status of currency and accessibility of the volumes and replicas.

At step 210, the conclusions of the analysis performed at step 208 are compared with the currency and accessibility requirements that are specified in the policy and if violations are detected, at step 212, notifications are provided regarding these violations. Such violations can be associated with the status or level of currency, for example all replicas of source volume 128 located at a remote location are at the moment less current than the minimum currency specified in the currency and accessibility requirements. Such violations can also be associated with accessibility, for example, if no remote replicas of source volume 128 are currently accessible by remote host-components as required.

Figure 3:
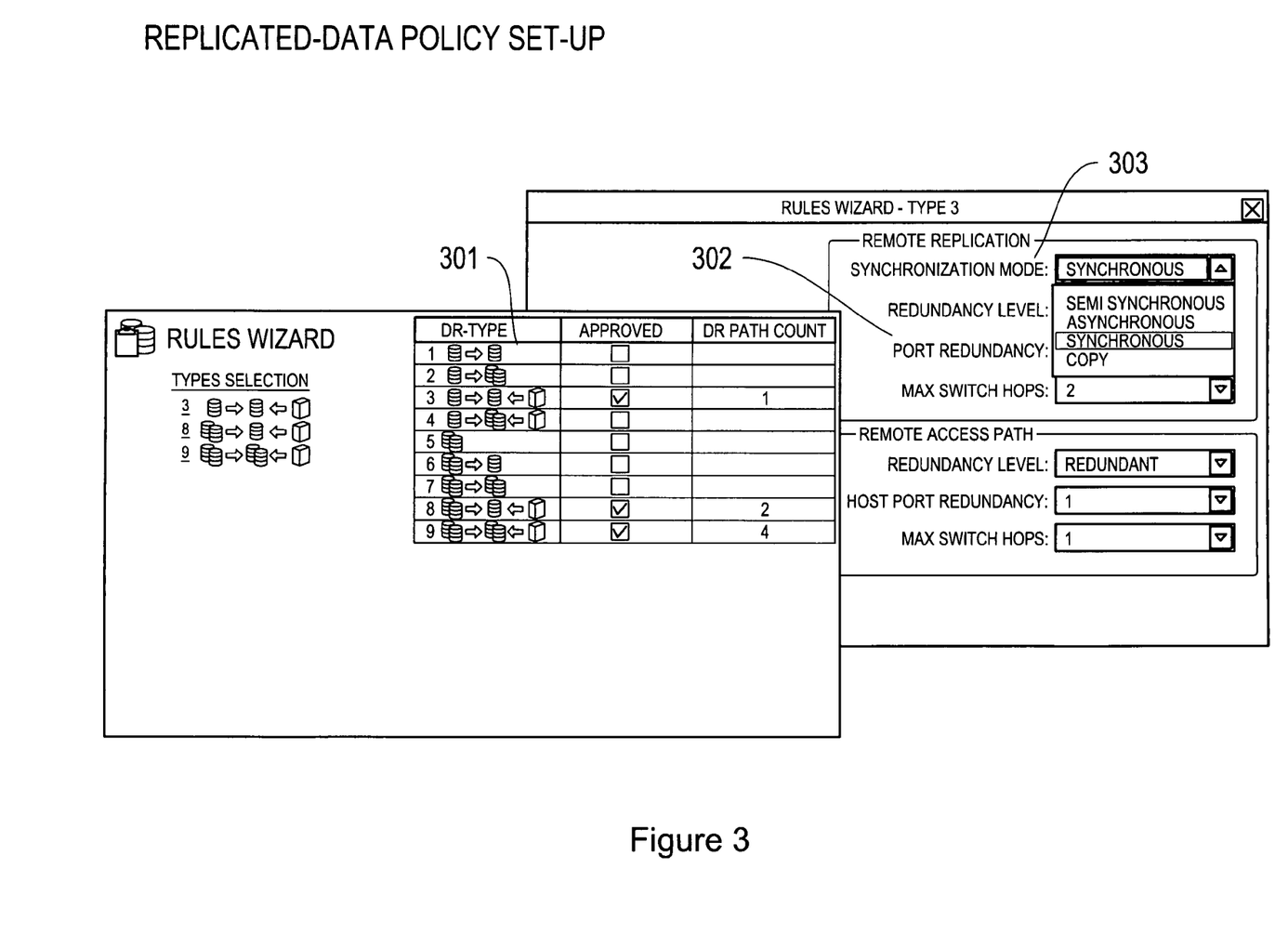
FIG. 3 shows a view of an exemplary replicated-data policy.

FIG. 3 shows an exemplary view of part of an application data-replication policy. Such policy is set up in step 202 of the data-replication validation process outlined above. The policy would include for each volume and each replica the type of access path needed to be associated with that access path 301, such as level of path redundancy 302, the number of replicas and the type of copy activities 303 (e.g., synchronous, asynchronous ) as well as other attributes.

In general, an applications replicated-data policy can specify for each volume in the environment: (1) which hosts and application should have an access path to that volume; (2) how many replicas should it have, where should they reside, and what should be the access path between these replicas; (3) what should be the maximum age of the replica at each location (what is the RPO); and (4) should any remote hosts have an access path to any of the replicas.

Thus the policy can represent many types of application requirements including, for example, the following exemplary requirements:

An application data volume should have at least a certain number (e.g. K) of replicas;

At least one of the replicas of that application volume should reside on a storage component which is geographically remote from the location where the application host component resides;

At least one remote replica should be accessible by another host-component at a remotely geographical location to the one the current application host component resides;

At least one remote replica of that application volume should represent a snapshot time (Recovery Point) of no longer than T time units before the current time;

The access path from the application host-component to the remote replica should have certain access-path attributes (for example should be dual-fabric redundant);

All data volumes of a given application should be remotely replicated with snapshots that are no longer than T time units before the current time;

All data volumes of a given application should be remotely replicated with snapshots associated with the same point in time, and that points should be no longer than T time units before the current time.

The next step in the replicated-data validation process (represented by step 206 in FIG. 2) involves collecting replication events information and configuration event information.

Data copier replication events information include for example:

A "Synch" event by a copier—together with the source volume (storage device and memory address), destination volume (storage device and memory address) and the time of the event.

A synch event represents the start of a copy of the state source to the destination followed by continuous copy of each consequent source update to the destination;

A "Copy-Completed" event by a copier—together with the source volume (storage device and memory address), destination volume (storage device and memory address) and the time of the event. A copy completed event represents the successful completion of a copy from the source to the destination. From that point any consequent update performed by any entity at the source volume will trigger a consequent copy of that update to the destination volume;

A "Split" event by a copier—together with the source volume (storage device and memory address), destination volume (storage device and memory address) and the time of the event. A split event represents the end of the synch relationship between the volumes. Following a split event no further copies (of state or updates) are performed between the source volume and the destination volume (until a consequent synch event).

A conventional asynchronous copy of one volume to another volume may also be represented by a Synch event followed by a simultaneous Copy-Completed and Split events. Any volume generated or updated by a Synch event of a copier is referred to as a Replica Volume.

Figure 4:
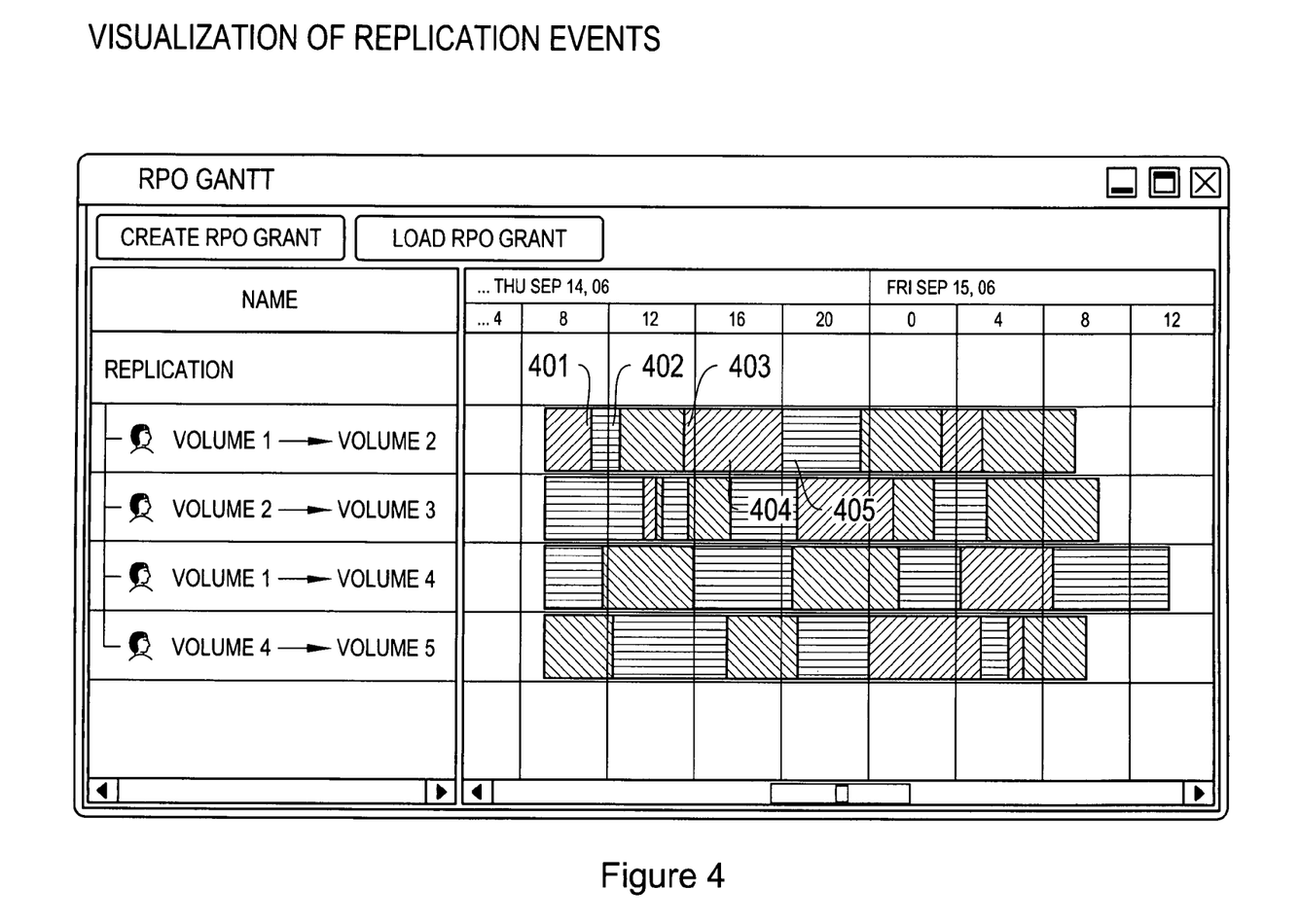
FIG. 4 shows an exemplary visualization of a timeline of replication events.

FIG. 4 shows an exemplary visualization of replication events.

At point in time 401, a synch copy event occurs between volume 1 and 2, at point in time 402 the copy is completed, and at point in time 403 a split event occurs. If a copy is initiated between volume 2 and 3 at point in time 404 and the copy is completed and a split is performed at point in time 405. In order to determine the currency of volume 3 after point 405 the history of previous copy events need to be considered. Note also that between the time a copy is started (for example, point in time 401) to the point in time it is successfully completed (for example, point in time 402), the state of the target replica is inconsistent.

Environment configuration events may also affect access paths. Event information collected include:

Any access-control configuration change on any host-component, network-component, or storage-component. Such events, which include for example lun-masking changes or zoning changes, affect whether the component will enable data flow from a particular source component to a particular destination component.

Any addition, deletion, or migration of a host-component, network-component, and storage component.

Any addition or deletion of a communication link between components.

Any addition, deletion, or migration of an application at a host-component.

Any addition, deletion, or migration of a volume at a storage device.

Any addition, deletion, or migration of a copier at any component.

The next step in the replication validation process (represented by step 208 in FIG. 2) involves analyzing the collected event information to derive currency and accessibility results.

The currency conclusions are derived from the replication event information in the following way. An association is maintained between each replica volume and a Replica Header Tag, which may include among others the following attributes:

Original Source Volume—name (storage device and address).

Status—In-synch, Snapshot, or Inconsistent.

Timestamp—Snapshot time.

The Replica Header Tag of a replica is updated in response to different copier events, as described above. These Tag updates can, for example, adhere to the following principles:

When a Synch event occurs in which this replica is a destination and the source volume is an original source volume (not a replica) then
  The "Original Source Volume" attribute in the Tag is set to the name of the source name of the Synch event
  The "Status" attribute in the Tag of the destination is set to "Inconsistent"
When a Synch event occurs in which this replica is a destination and the source volume is a replica then
  The "Original Source Volume" attribute in the Tag is set to the name of the original source name of the Tag of the source replica
  The "Status" attribute in the Tag of the destination is set to "Inconsistent"
When a Copy-Completed event occurs in which this replica is a destination and the source volume is an original source volume (not a replica) then
  The "Status" attribute in the destination Tag is set to "In-synch"
When a Copy-Completed event occurs in which this replica is a destination and the source volume is replica then
  The "Status" attribute in the destination Tag is set to be the same as the "Status" attribute of the source Tag
  The "Timestamp" attribute in the destination Tag is set to be the same as the "Timestamp" attribute of the source Tag
When a Split event occurs in which this replica is a destination and the source volume is an original source volume (not a replica) and the destination Tag Status is not "Inconsistent" then
  The "Status" attribute in the destination Tag is set to "Snapshot"
  The "Timestamp" attribute in the destination Tag is set to the current time
When a Split event occurs in which this replica is a destination and either the status in the Source or the Destination Tag is "Inconsistent" then
  The "Status" attribute in the destination Tag is set to "Inconsistent"
When a Split event occurs in which this replica is a destination and the source volume is a replica then
  The "Status" attribute in the destination Tag is set to "Snapshot"
  The "Timestamp" attribute in the destination Tag is set to set to be the same as the "Timestamp" attribute of the source Tag Accessibility conclusions are derived from the environment configuration events information by determining all the access paths in the environments. That is, deriving all the volumes and replicas at all storage devices that each initiating component can obtain data from or provide data to. The analysis is performed repeatedly after each event using the following underlying principles:

An access path exists between an initiator component and a target component if there exists a communication connectivity (at least one communication link and possible additional intermediate components interconnected with communication link) between the initiator component and the target, and the access control configuration on each component in the sequence (starting with the host and ending with the storage device) is set to enable data flow between the sources in the prefix of the sequence to the destinations in the postfix of that sequence.

Furthermore, the current step in the process derives for each identified access paths various end-to-end attributes of that access-path as determined by cumulative analysis of all the state information and events information associated with components in that access path. These derived access path attributes represent various service dimensions such as level of redundancy in the path, level of access performance within the path, number of intermediate components between host and target volume, storage capacity, among others.

This analysis may also establish in a similar way the existence of appropriate access paths between data copiers and data volumes (source and target volumes).

An extended type of an access path is a Disaster-Recovery Access-Path (DR-Path) which represents an access relationship between host-components and a sequence of a number of replica volumes (local and remote).

Such a notion of a DR-Path is a useful way to specify and enforce both the host to volume required access attributes as well as the volume to replica and replica to replica required access attributes.

Such DR-Paths can be formally defined in a number of ways, for example, as follows:

Let $v_1 \ldots v_n$ be data sets. Each data set $v_i$ is of a certain type $t_k$ that belongs to a set of types $\{t_1, \ldots, t_m\}$.

A path segment exists between $v_i$ and $v_{i+1}$ if there is physical connectivity between $v_i$ and $v_{i+1}$ and also logical connectivity between them. $v_i$ and $v_{i+1}$ have logical connectivity if the physical path/s between them complies with certain set of rules that are a function of $v_i$ and $v_{i+1}$'s types.

A path exists from $v_k \ldots v_l$ if for every $k \leq i < l$ there exists a path segment from $v_i$ to $v_{i+1}$.

Another exemplary definition:

Let $v_1 \ldots v_n$ be computing nodes. Each node $v_i$ is of a certain type $t_k$ that belongs to a set of types $\{t_1, \ldots, t_m\}$.

A Stored-Data Access-Path $v_k \ldots v_l$ exists if there is physical connectivity from $v_k$ to $v_l$, and if the logical state of each node $v_i$, $k \leq i < l$ in the sequence is set to enable data flow along that sequence to or from a longer-term storage type node (in response to an initiation action by one of the other nodes in the sequence).

Another exemplary definition:

Let $H_i$ denote hosts, Let $D_j$ denote Storage Area network (SAN) devices (switches, routers, HBAs, etc.—local area or wide area networks), and let $V_k$ denote stored data sets (volumes on storage devices)

A DR path is a sequence $H_a$-$V_m$-....-$V_n$[-$H_b$], such that:
  $V_m, \ldots V_n$—are either identical copies of the same data sets or are derived copies (older snapshot, processed data mining version, etc)
  There is physical connectivity (local cables, remote links, intermediate SAN devices etc) between each consecutive member of the sequence,
  Each intermediate SAN device is properly configured (e.g. zoning, lun-masking, etc) to allow data flow along that sequence
  (Optionally) information flow is similarly enabled (physically and logically) between $H_b$ and $V_m, \ldots, V_n$ (or a subset of these)

Multiple types of DR-Paths can be predefined, each representing a particular permutation of replica types, and potentially a remote host associated with a specific sequence at the other end.

For example, EMC Corporation, Hopkington, Mass. (USA) supplies infrastructure storage components. EMC's technology refers to specific names for replica types (e.g. BCVs, R1s, and R2s representing local and remote synchronous and asynchronous replicas respectively) and imposes certain constraints on the replica type copy sequence relationship.

In the context of EMC infrastructures, the following are examples of possible predefined DR-Paths types which can be used and enforced:

Host-R1-BCV
Host-R1-R2
Host-R1-R2-RemoteHost
Host-R1-R2-RemoteBCV-RemoteHost
Host-R1-BCV-R2
Host-R1-BCV-R2-RemoteBCV
Host-R1-BCV-R2-RemoteBCV-RemoteHost.

Each represents an access-path relationship between a host and a volume, between a volume and replica, possibly between a replica and a replica, and between a replica and a host.

The next step in the replicated-data validation process (represented by step 210 in FIG. 2) involves comparing the derived accessibility and currency conclusions and comparing these to the policy. That is, the analysis enables to establish continuously for each application that the state of the replicated data of this application fully adheres, at all times, to the appropriate replicated-data requirements of that application.

These requirements and others can be established with the replication analysis and access-path analysis mechanisms outlined above as follows:

Establishing the number of replicas of a given data volume of a given application, corresponds to identifying all the replicas which have a Tag in which the original source volume is the given volume.

Establishing which of these replicas is currently accessible by the given application corresponds to deriving which access path exist between the application on the host components and each of the replica volume on the storage components.

Establishing which of the replicas is geographically remote corresponds to determining that the location of the storage component is at a sufficiently long distance relative to the location of the host component (or to the location of the storage device with the original source volume).

Establishing that a given remote replica is accessible by a remote host corresponds to identifying an access path between that host component and that replica volume, and that the locations of both the host-component and the storage-component are sufficiently remote geographically from the original application host-component (or from the original source volume storage-component).

Establishing that at least one remote replica of an application volume represents a snapshot time (Recovery Point) of no longer than T time units before the current time, corresponds to determining that in its Tag the original source volume attribute corresponds to the required one, that the status attribute is In-Synch, or the status attribute is Snapshot and the current time minus the Timestamp attribute is no greater than T time units.

Establishing that all the replicas of a given application should reflect a state which is at most T time units in the past (Recovery point for the application) corresponds to performing the above process for each of the volumes of the applications, determining the minimal timestamp in all tags who are not in a state of In-Synch, and establishing that the current time minus this minimal timestamp is no greater than T time units.

Establishing that all the replicas of a given application should reflect a state which is at the same point in time, which at most T time units in the past (Recovery point for the application) corresponds to performing the above process for each of the volumes of the applications, and determining that either they are all in status of In-Synch, or they are all in a status of Snapshot and with the same timestamp for all the replicas, and that timestamp is no longer that T time units prior to the current time Any discrepancy between the derived conclusions and the policy requirements is considered a violation. Thus a replicated data violation can represent a case in which a volume is not accessible to a host or to another replica in a manner consistent with its DR-Path specification in the policy, that one of the attributes of the existing access path or DR-path is different than the one specified in the policy, or that the most current replica of that volume beyond a specified distance is older than the Recovery Point Objectives (RPO) specified by the policy.

Figure 5:
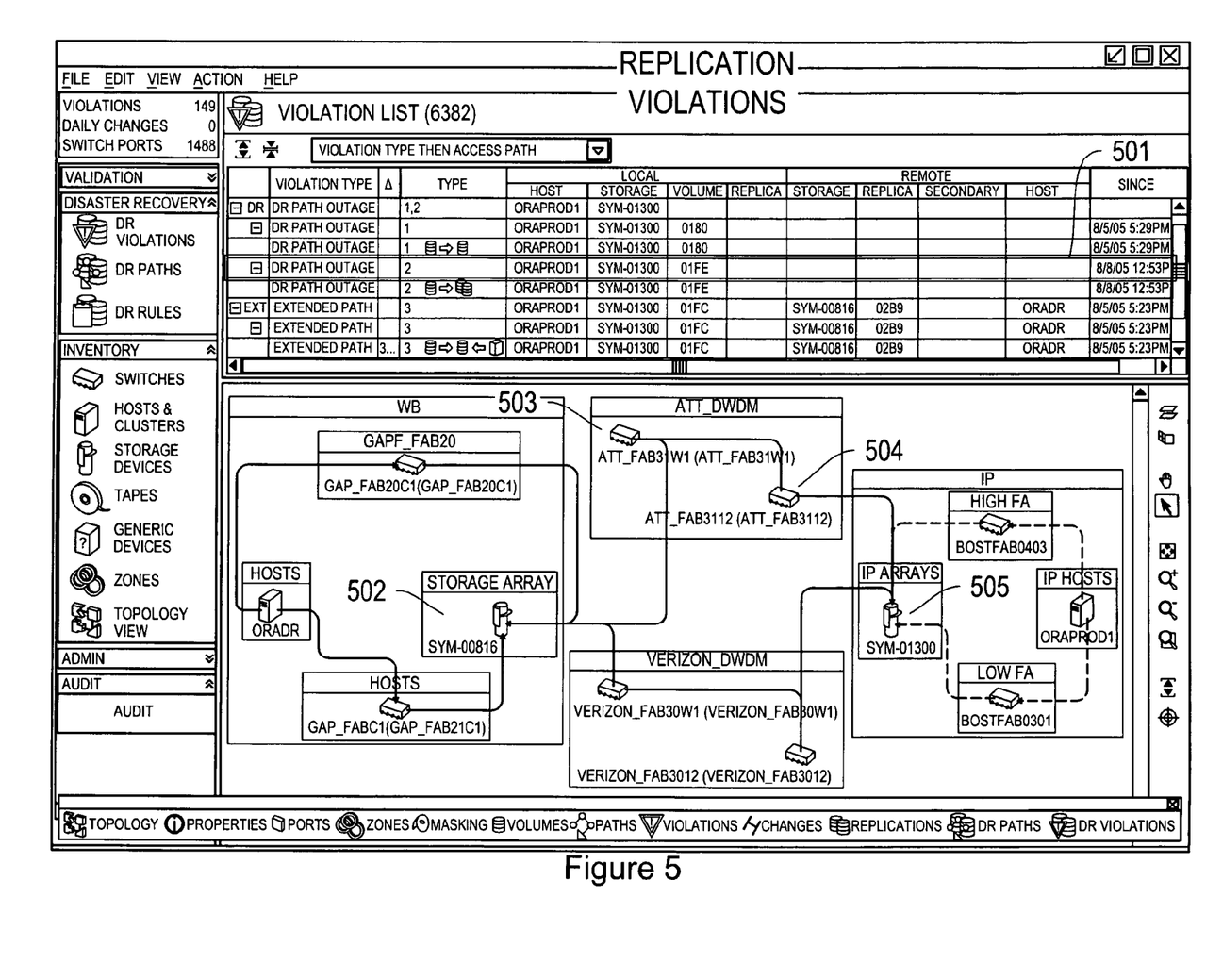
FIG. 5 shows schematically an exemplary diagram of replication violations.

FIG. 5 shows schematically an exemplary diagram of a replication violation, with row 501 providing a description of an exemplary violation. This violation is of a type "DR Path Outage" and involves the disruption of accessibility between a volume on storage component 502 to its replica on storage component 505. The access path between these two storage components also include network components 503, 504. An event has occurred somewhere along that path and prevents the flow of information between storage components 502 and 505, and thereby prevents any copy activity involving volumes and replicas on these two storage components from occurring—potentially rendering the replica at storage component 505 as not sufficiently current, or not consistent (if the disruption occurred during a copy activity).

The next step of the replication-validation process process (represented by step 212 in FIG. 2) involves generating an appropriate notification for each violation together with relevant context information. The context information can include, for example, the type of violation, the volume and application affected, the time of the violation, and the root-cause of the violation. The event that triggered the violation is referred to as the root cause of the violation, either by the fact that the event occurred, or by the fact that it did not occur. Based on such context information, violations can be classified and appropriate filtering mechanisms can determine which violation notification should be forwarded to which party.

Figure 6:
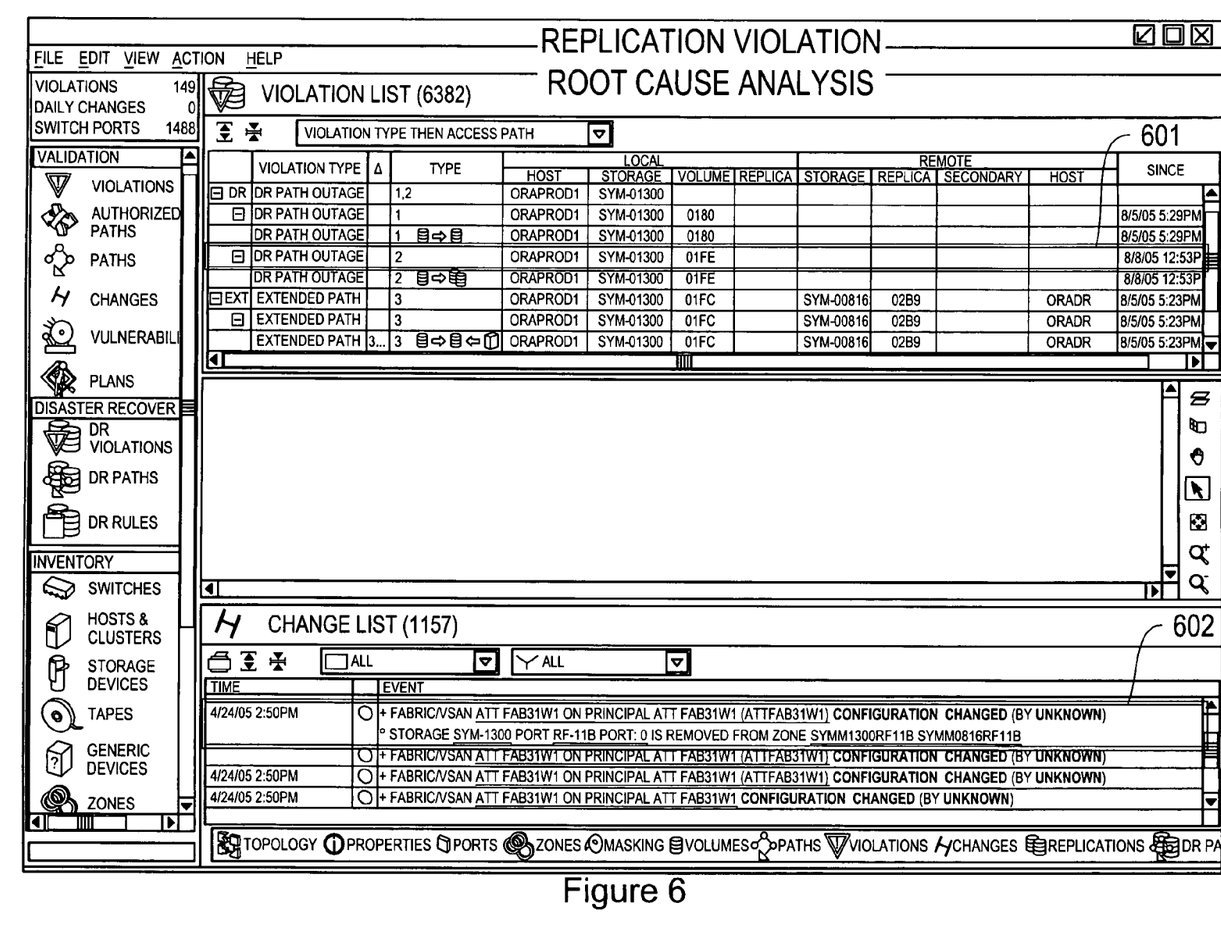
FIG. 6 shows schematically an exemplary diagram of a root-cause analysis of a replication violation.

FIG. 6 shows schematically an exemplary diagram of a root-cause analysis of a replication violation. row 602 identifies the event as the root cause of the violation 601 (depicted also as 501 in FIG. 5) and displays context information. The event occurred at Apr. 24, 2005 at 2:50pm and involved a zoning configuration update on network component 503 (FIG. 5), which had the effect of preventing any further data traffic between storage component 502 and storage component 505. With this context information in hand, a system administrator can immediately take corrective action to correct the violation simply by issuing another zoning configuration update to component 503.

The violation and the context information are listed and stored, and appropriate notification messages may be generated and sent to appropriate parties based on filtering rules that are applied to the violation information. The correction of a violation is also automatically detected by the mechanisms described, and the stored repositories are updated and appropriate notification messages can be sent.

The current process also stores received event information (from components and from data copiers) in a history structure in a database, and associates with each event the derived access path conclusion results. That history database represents the complete evolution of the access paths status in the environment is available for further analysis and summary reporting.

Another possible embodiment of the invention enables planning and simulation of future changes, events, and failures to determine their expected impact on the replication requirements, and prevent problems before they occur.

The events that can be specified are possible future component change actions, possible data copiers action, or possible component failure or site failure.

The analysis performed is analogous to the one described above using the current state of the environment components and replicas, and considering the simulated event input as if this is the event information that was collected from the environment (represented by step 204 of FIG. 2) simulating the cumulative effect of the specified actions, and determining whether any violation will be generated if these actions were to actually occur in the environment.

The context information of each such future violation is generated and provided in the same way provided for regular violations (see above). Once validated, the innovation can actually track the execution of any corresponding change events, track implementation progress, and reports upon successful completion (or notify of any resulting violations).

Yet another embodiment of the invention enables summary reporting of the information accumulated and processed during the replication validation process. The information collected and analyzed by the current innovation enables the generation of a wide variety of useful data replication validation summary reports and trending reports.

The types of reports that can be generated include for example the following, among many others:

- All replica volumes of selected applications and their attributes
- The number of replica volumes for each application in relation to the requirements (too many represent potentially wasted capital resources, too few represent a potential risk)
- All current replication violations with context information parameters
- All replication violations that occurred within any given window of time
- Average time to correct replication violations—trending over time
- Accessible replica status in the face of a failure scenario (such as a catastrophic site failure)
- Trending over time of number of replicas of an application, capacity of storage taken by replicas, and others.

While the invention has been disclosed in connection with the preferred embodiments shown and described in detail, various modifications and improvements thereon will become readily apparent to those skilled in the art. Various aspects of access path, their validation and management, are described, for example, in commonly assigned U.S. patent applications Ser. No. 10/693,632, filed 23 Oct. 2003; and Ser. Nos. 11/112,942 and 11/112,624, both filed 22 Apr. 2005, the contents of which is incorporated herein by reference in their entirety. Accordingly, the spirit and scope of the present invention is to be limited only by the following claims.

What is claimed is:

1. A process for validating replicated data residing on network devices in a network, comprising:

defining a replicated-data policy for replicating data in the network wherein the replicated-data policy specifies at least a recovery point objective for a set of replicas in the network, wherein the recovery point objective specifies at least a maximum recovery point age of a replica;

monitoring access paths and access path attributes between at least one of network devices and applications running on the network devices, said access paths defining end-to-end communication connectivity between the at least one of network devices and applications;

monitoring data replication activities in the network wherein monitoring data replication activities includes monitoring at least one of a copy start, a copy complete, a synch, a split, a source data volume, a target data volume, and a time of replication;

comparing currency and accessibility of a set of replicas with the requirements in the replicated-data policy to identify discrepancies with the replicated-data policy wherein comparing the currency includes comparing a computed recovery point age of a replica in a set of replicas with the recovery point objective specified in the replicated-data policy and comparing the accessibility of the set of replicas includes comparing a set of access paths associated with the set of replicas to an accessibility requirement specified in the replicated-data policy, thereby validating the replicated data residing in the network, wherein identifying discrepancies includes identifying at least one of currency violation, missing access path, unauthorized access path, and path attribute violation; and providing a violation notification if a discrepancy is identified.

2. The process of claim 1, wherein the replicated-data policy further specifies at least one of an access path between a host or application and a replica, a number of replicas in a network, locations of the replicas, and one or more access paths between the replicas.

3. The process of claim 1, wherein the currency of each replica includes a copy status selected from the group consisting of in-synch, snapshot time, and inconsistent.

4. The process of claim 3, wherein each replica is associated with a tag which includes at least one of a source data set name, the copy status, and a time stamp.

5. The process of claim 4, wherein the tag of a replica is updated in response to a copier event.

6. The process of claim 1, wherein comparing accessibility of a replica includes identifying at least one of access path to a local host, access path to a remote host, a disaster recovery access path, and an access path to a data copier, said access path conforming to access path attributes defined in an access path policy.

7. The process of claim 6, wherein the access path attributes include at least one of level of end-to-end access path redundancy, number of intermediate components, performance, security, interoperability, sharability, and capacity.

8. The process of claim 1, wherein the violation notification includes at least one of e-mail, SNMP, violation type, affected hosts, time of copy start, and root cause event.

9. The process of claim 1, further including comparing currency and accessibility of replicas of different data volumes and identifying cross-consistency violations.

10. The process of claim 1, further including simulating an effect of future network events and actions on the currency and accessibility of a replica.

11. The process of claim 1, further including generating replication reports which include at least one of applications, replicas and replication properties; events and impact on replication properties; replication violations and time to correct them; and replication resource utilization over time.

12. The process of claim 1, wherein computing the recovery point age of a replica involves deriving a new timestamp for that replica based on a source data set timestamp and a status for each copy event in which the replica is a destination data set.

13. The process of claim 1, wherein computing the associated access path and access path attributes involves constructing an abstract graph representation of the network topology such that each node in the graph represents an application, data set, or a replica, and each edge represents an information flow capability between two nodes, wherein the information flow capability is determined by node configurations and a physical communication link between the two nodes, and determining that the information flow capabilities and attributes between any two nodes are consistent with these specified in the replicated-data policy.

14. The process of claim 1, wherein the set of replicas comprises at least a first replica and a second replica.

15. The process of claim 14, wherein the first replica and the second replica have different currency.

16. The process of claim 14, wherein the first replica and second replica have different accessibility.

17. A replication-data validation management system, comprising:
  memory, configured to store a replicated-data policy for replicating data in a network wherein the replicated-data policy specifies at least a recovery point objective for replicas in a set of replicas in the network, wherein the recovery point objective specifies at least a maximum recovery point age of a replica;
  a network interface, communicably coupled to the network;
  a replication-data validation manager, electronically connected to the memory and to the network interface, configured to:
    monitor access path, using the network interface, between at least one of network devices and applications running on the network devices, said access paths defining end-to-end communication connectivity between the at least one of the network devices and applications,
    monitor data replication activities in the network, using the network interface, wherein monitoring data replication activities includes monitoring at least one of a copy start, a copy complete, a synch, a split, a source data volume, a target data volume, and a time of replication,
    compare currency and accessibility of a set of replicas with the requirements in the replicated-data policy to identify discrepancies with the replicated-data policy, wherein the replicated-data policy is retrieved from the memory, comparing the currency includes comparing a computed recovery point age of a replica in a set of replicas with the recovery point objective specified in the replicated-data policy and comparing the accessibility of the set of replicas includes comparing a set of access paths associated with the set of replicas to an accessibility requirement specified in the replicated-data policy wherein identifying discrepancies includes identifying at least one of currency violation, missing access path, unauthorized access path, and path attribute violation; and
    provide a violation notification if a discrepancy is identified.

18. The system of claim 17, wherein computing the recovery point age of a replica involves deriving a new timestamp for that replica based on a source data set timestamp and a status for each copy event in which the replica is a destination data set.

19. The system of claim 17, wherein computing the associated access path and access path attributes involves constructing an abstract graph representation of the network topology such that each node in the graph represents an application, data set, or a replica, and each edge represents an information flow capability between two nodes, wherein the information flow capability is determined by node configurations and a physical communication link between the two nodes, and determining that the information flow capabilities and attributes between any two nodes are consistent with these specified in the replicated-data policy.

20. The system of claim 17, wherein the set of replicas comprises at least a first replica and a second replica.

21. The system of claim 20, wherein the first replica and the second replica have different currency.

22. The system of claim 20, wherein the first replica and second replica have different accessibility.

* * * * *